Patented Jan. 2, 1934

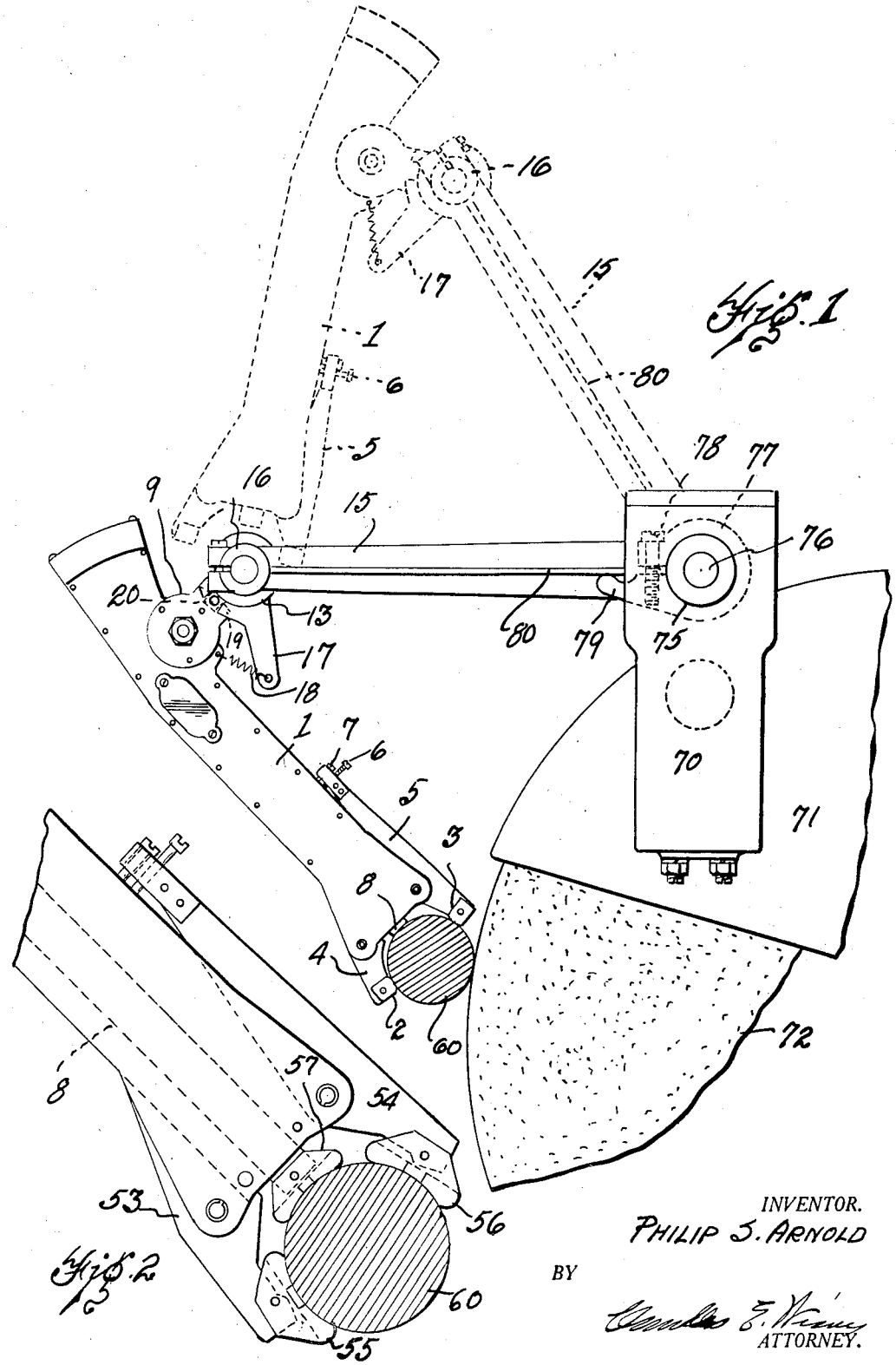

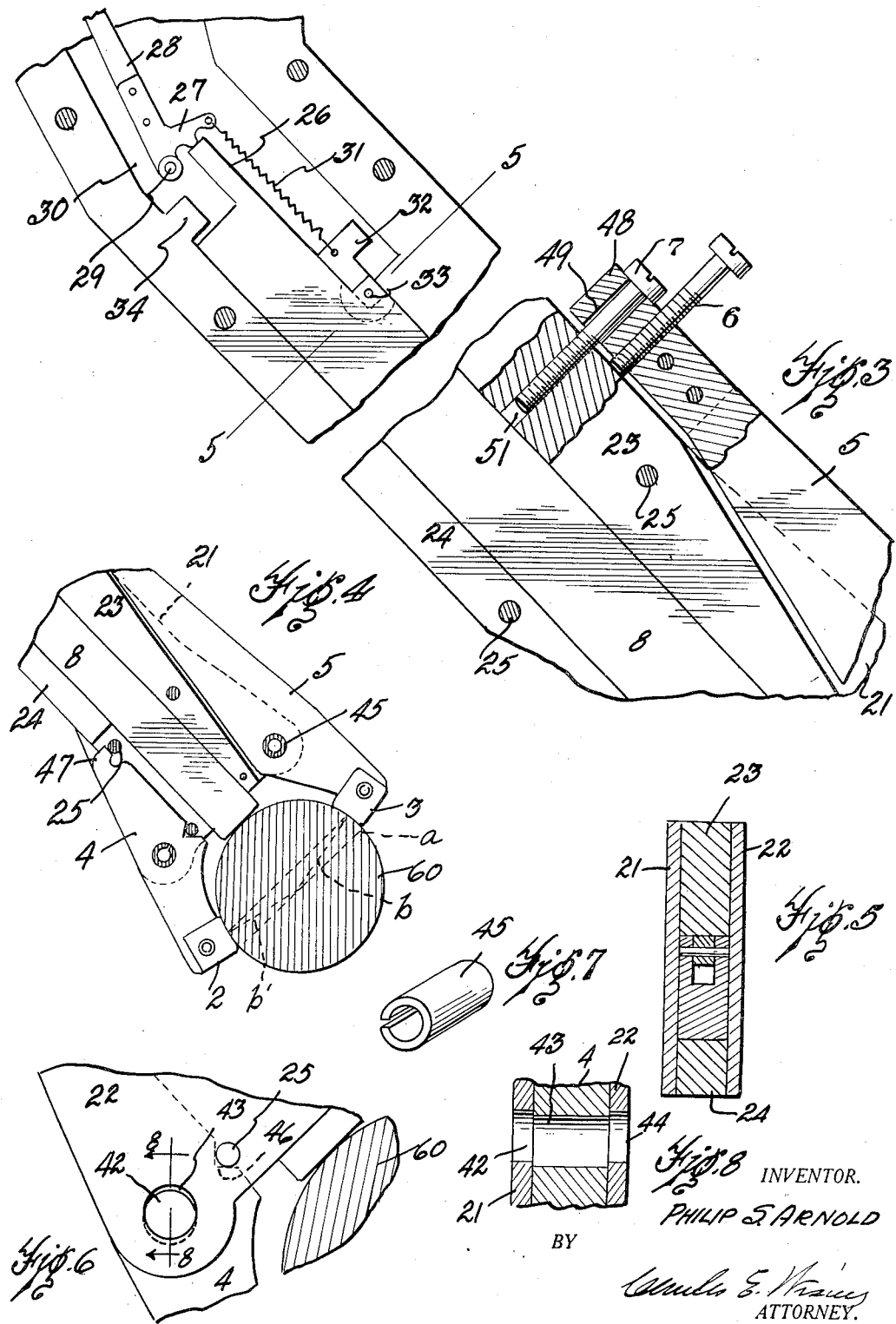

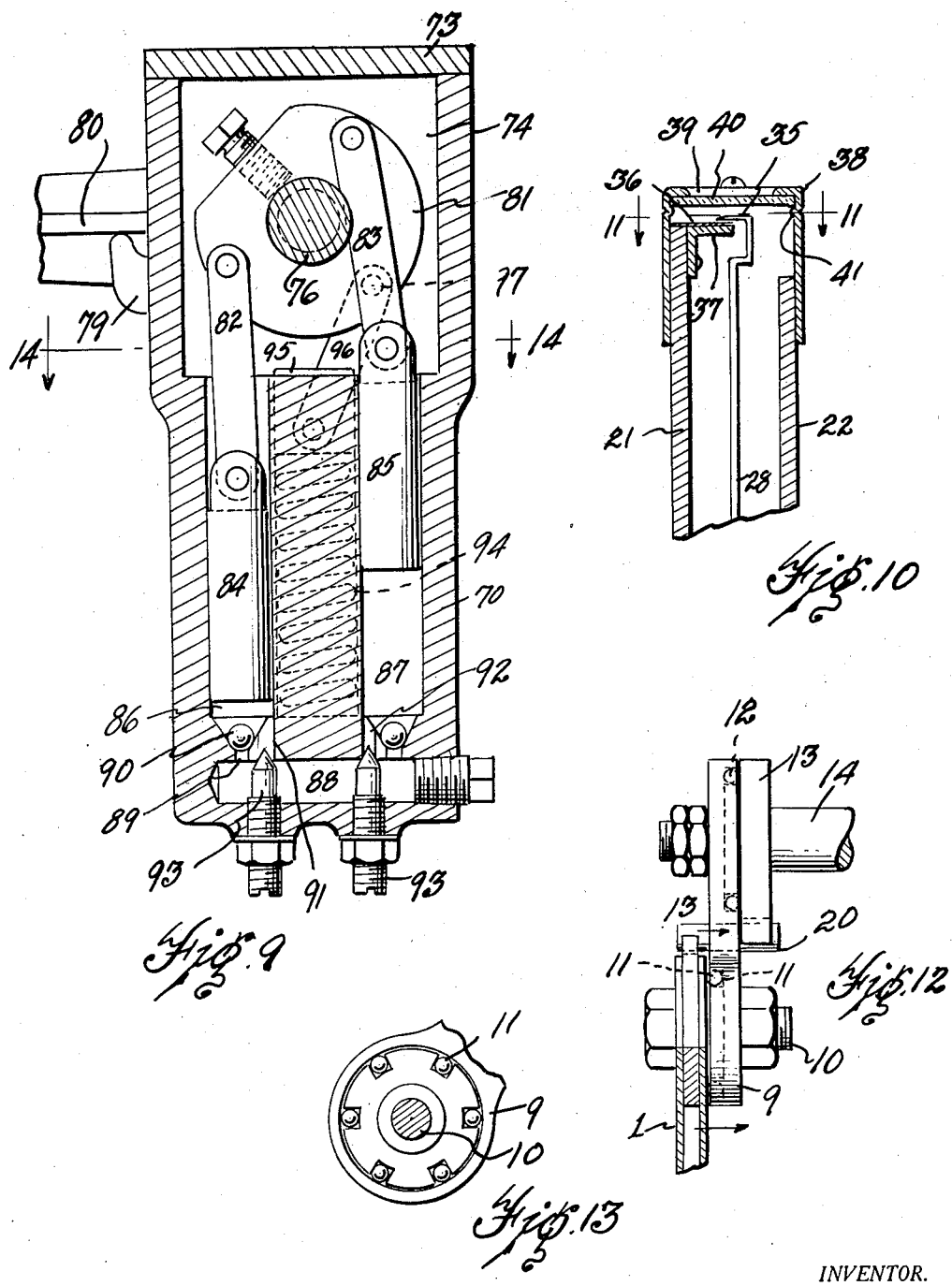

1,941,456

UNITED STATES PATENT OFFICE 1,941,456

GRINDING GAUGE

Philip S. Arnold, Flint, Mich., assignor of one-fifth to Charles E. Wisner, Detroit, Mich.

Application August 23, 1928. Serial No. 301,493

13 Claims. (Cl. 33—172)

This invention relates to gauges for gauging cylindrical work during the reducing of the diameter thereof and for the inspection of checking of finished cylindrical work, and a major feature of the invention is in the provision of a novel means for indicating the diameter of the work which includes a construction automatically causing the gauge to be moved onto the work as it is reduced in diameter, which movement is utilized to actuate an indicator relative to a dial, the indicator movement being greater than the thickness of stock removed to clearly visualize the extent and rapidity of reduction in diameter of the work.

In previous gauges it has been necessary to connect a movable element by means of levers and the like with an indicator in such manner that the space traversed by the indicator is a multiple of the thickness of stock removed.

An object of this invention is to reduce the number of parts heretofore found necessary to produce the desired movement of the indicator and I have accomplished this by a novel construction and method of gauging which consists in the provision of a pair of contact points or shoes whose distance apart is to a predetermined extent less than the diameter to which the work is to be ground and thus at the beginning of the gauging operation the shoes or points engage the work at such point that a straight line from the center of one shoe to the other is forward of the diametrical line of the work and as the work is reduced in diameter the tool may be moved toward the work. By arranging an indicator operating rod on a line centrally between the shoes or points contacting the work and at a right angle to a straight line between the centers of these shoes or points this rod moves to an extent which is a multiple of the thickness of stock removed as is hereinafter more fully described.

The principal object of the invention therefore consists in the provision of a tool having fixedly spaced gauging elements or shoes, an indicator and operating means therefor caused to move by positioning the tool on the finished work or moving the same thereonto as the work is being finished indicating the diameter thereof when the tool has been moved a predetermined distance toward a diametrical line of the work.

These and other objects and the several novel features of the invention are hereinafter more fully described and claimed, and an automatic gauge embodying my invention is shown, in its preferred form of construction, in the accompanying drawings in which—

Fig. 1 is a side elevation of my improved gauge showing its relationship with a piece of work being ground.

Fig. 2 is an elevation showing the work engaging the end of the gauge on a larger scale and showing an alternative form of the work contacting shoes.

Fig. 3 is an enlarged detail partly in section of the body of the gauge showing a means of adjusting the spacing of the work contact shoes and the indicator end of the indicator actuating bar or rod.

Fig. 4 is a detail on an enlarged scale of the work contacting end of the gauge of the form shown in Fig. 1.

Fig. 5 is a section taken on line 5—5 of Fig. 3.

Fig. 6 is a detail on an enlarged scale showing the manner of mounting one of the arms carrying a contact shoe.

Fig. 7 is a detail in perspective of the preferred form of pin used in securing the contact arm to the body of the guage.

Fig. 8 is a section taken on line 8—8 of Fig. 6.

Fig. 9 is a section in elevation of part of the semi-automatic mechanism for positioning the gauge on the work being ground and for moving the gauge to non-operating position.

Fig. 10 is a sectional view of the indicator end of the gauge.

Fig. 12 is a plan view of the means connecting the gauge body with its carrying arm.

Fig. 13 is a section taken on line 13—13 of Fig. 12.

Figure 14:
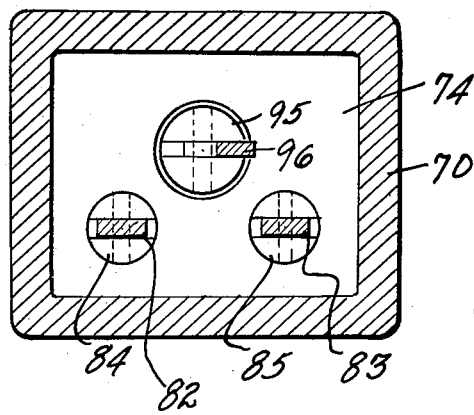
Fig. 14 is a section taken on line 14—14 of Fig. 9.

The gauge forming the subject matter of this invention is of use wherever objects are to be ground to cylindrical form and is particularly adaptable for use in present day high speed "production" where its semi-automatic features and ease of handling are of the greatest importance.

In present day manufacturing plants where quantity production as well as exactness in the manufacture of the parts is required it is of very great importance to provide instrumentalities the operation of which does not depend upon the skill of the operator. Heretofore in the gauging of the work by hand not only are skilled workmen required but considerable loss of time is involved in the necessity of stopping the progress of the work to enable the gauging operation to be performed. Under such conditions the work is oftentimes ground or otherwise finished to a less or greater degree than is required all of which results in considerable loss to the manufacturer. This invention seeks to obviate these difficulties and provide a gauge by means of which even inexperienced persons may determine when the work has been properly finished and to cause cessation of the diameter reducing operation at the exact time the object is reduced to the predetermined diameter.

Generally the invention consists of a gauge member indicated in Fig. 1 by the numeral 1 which is provided with the spaced contact blocks 2 and 3 carried respectively by arms 4 and 5, the arm 5 being adjustable, as hereinafter more fully described by the screws 6 and 7, to enable the contact blocks or members 2 and 3 to be set in adjustably fixed position for use with work being ground to a specified diameter. An indicator actuating bar or rod 8 is positioned and is movable on a line extending at a right angle to the diameter of the work on which the gauge is to be positioned and one end thereof rides in contact with the surface of the work being ground approximately equidistantly from each of the contact blocks 2 and 3.

As is hereinafter more fully described, when the tool is first placed on the work the blocks or shoes are so positioned that a diametrical line of the work is forward of a line passing from the point of contact of one shoe 2 to that of the other shoe 3 but as the work is reduced in diameter these blocks 2 and 3 may move toward such diametrical line and this movement results in the operation of the indicator bar 8 whose operative relationship is hereinafter more fully described. Although this movement of the tool onto the work may be performed by hand, it is desirable to provide automatic means urging the tool onto or toward the work as the grinding or diameter reducing operation proceeds. For this purpose the gauge body is pivotally supported on a link 9 by means of a bolt 10 extending through the body adjacent its indicator end and through an end of the link, there being an anti-friction bearing 11 interposed between the body and the link as shown in Fig. 12. Also a similar anti-friction bearing 12 is interposed between the opposite end of the link and a collar 13 attached to a shaft 14 fixedly secured in the end of a supporting arm 15, the arm being provided with a split bearing 16 at its outer end as shown in Fig. 1. This collar 13 has a depending arm 17 which is held from movement by reason of being in fixed relation with the shaft 14 and its lower end is connected by means of a spring 18 with a convenient part on the body of the tool as shown. This spring tends to draw the tool in a direction to cause the same to feed onto the work as will be understood from Fig. 1.

In order that the tool may be retained in approximately correct position when off the work a member 17 is provided with a notched portion 19 and the link 9 is provided with a pin 20 which will come to engagement with the projecting notch 19 and limit the movement of the tool by the spring 18 when the arm 15 is raised but sufficient latitude of movement is provided to enable the gauge blocks when in contact with the work to move to an extent necessary for the determination of the diameter of the work. This point is visually indicated by an indicator hereinafter described, operated by movement of the rod or bar 8.

From this general description of the manner of operation of the tool, its details of construction and co-operative relationship of the parts will be more clearly understood. These are shown in Figs. 2, 3, 4 and 5 principally. Firstly, it is to be observed that one of the objects to be obtained is to secure a tool that is comparatively narrow in width and light of weight and thus is easily handled and enables the device to be used on work in which the part being ground is of little width. To this end the tool is formed of two side plates 21 and 22 spaced by means of a bar 23 on one side and a bar 24 on the opposite side thereof and rivets 25 are passed through the respective blocks and side plates fastening the same together. The spacing of the bars or blocks 23 and 24 provide a way for the indicator actuating bar 8.

This bar at its forward or work engaging end rides in contact with the work as will be understood from Figs. 1 and 4 and at its opposite or indicator end is formed with an extension 26 engaging the short arm 27 of the indicator lever 28 which is pivoted at 29 in the enlarged space 30 provided between the bars.

A coiled spring 31 is attached at one end to the terminal of the short arm 27 and extends parallel with the bar and attached at the opposite end to a member 32 pinned at 33 to the bar 8. This spring 31 holds the indicator arm 27 in contact with the actuator bar 8 although the member 32 may move outwardly with the actuator bar, such movement only tends to increase the tension of the spring as such movement of the bar turns the indicating lever to the left of the position shown. A lug 34 is provided on the spacer bar 24 which extends into the path of movement of the end of the bar 8 and limits its extent of travel so that the indicator lever can never be moved in contact with the wall of the casing and thus breakage is prevented by provision of this stop member 34.

Figure 11:
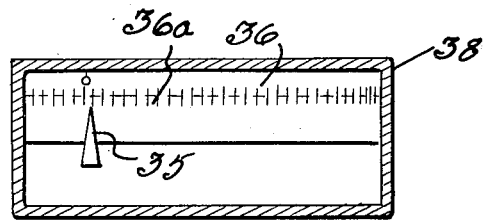
Fig. 11 is a section taken on line 11—11 of Fig. 10.

The upper end of the body of the tool is shown in Fig. 10 which also shows the upper end of the indicator arm formed with a return bent pointer portion 35 lying over an indicator plate 36. This plate is provided with graduations and a zero point as shown in Fig. 11. The indicator plate 36 is sustained in place by a bracket 37 attached to one of the side plates 21 of the body members and a protecting cap 38 is provided having spaced sides to frictionally engage over the side walls 21 and 22 of the body. This cap member has an aperture 39 in its outer face and a transparent member 40 is secured therebeneath by means of punched in lugs 41. By simply removing this cap member 38 the indicator point or plate may be exposed for repair or inspection.

From the views Figs. 10 and 11 and Fig. 3 it will be seen that outward movement of the rod 8 in its way causes movement of the indicator pointer 35 practically in the line of vision of the operator who stands in front of the machine to the left of Fig. 1. Thus, the travel of the pointer across the graduations provides a visible indication of the extent of removal of stock and the parts are so arranged that the pointer reaches the zero point at the instant the gauge blocks or contact points reach their predetermined position on the work.

At the work end of the tool is mounted the arms 4 and 5 which carry the gauge blocks 2 and 3 as previously stated. These arms are approximately of the same thickness as the bars 23 and 24, the bars 23 being cut away on an angle as shown in Fig. 4 permitting the member 5 to be inserted between the side plates 21 and 22. These plates are formed with ears respectively having apertures 42 and 44 with which the aperture provided in the respective bars 4 and 5 are practically in registration. However, as is shown in Figs. 5 and 6, the apertures 42 and 44 in the side plate are slightly offset from the aperture 43 of the shoe carrying arm 4 for instance, while the apertures 42 and 44 of the plates 21 and 22 are in alignment. With this arrangement the pin 45, which is in the form of a split tube, is forced into place and due to the direction in which the apertures are offset as will be observed from Fig. 6, this arm is forced upwardly from the position shown in Fig. 6 bringing the V notch 46 formed in the edge thereof to engagement with a pin or rivet which may be one of the rivets 25 fastening the parts together.

This engagement with the rivet tends to turn the arm on the pivot tube 45 throwing the upper end 47 of the arm 4 to contact with another rivet 25 which is positioned properly for such purpose. Thus, this arm is rigidly fixed in position by the driving of the pivot member 45 into place. The split tube has the edges spaced slightly and one end tapered so that the same on being driven to place tends to be contracted. The member 5, which is the adjustable arm, is pivotally supported upon a similar pivot pin but this member 6 has at its upper end a block 48 having an aperture 49 near its end through which is passed the screw 7 having threaded relation with a threaded aperture 51 therefor in the spacer bar 23. This block 48 likewise has a threaded aperture for the screw 6 which bears at its inner end on the face of the spacer 23. By manipulation of these screws the shoe or contact member 3 may be varied in its distance from the member 2 and thus an accurate adjustment of the distance apart of these shoes may be made. This adjustment not only compensates for wear but also permits use of the tool on several different diameters of work.

Instead of the fixed contact points 2 and 3 described these arms may be changed slightly in form as shown at 53 and 54 in Fig. 2 to which are pivotally supported radius blocks 55 and 56 respectively. A similar radius block 57 is supported on the end of the actuator bar 8. These blocks extend over a considerable surface of the work being ground, which is indicated at 60 in the several views, and are of particular service where the part being ground is formed with a keyway or longitudinal groove. The blocks shown in Fig. 2 are of sufficient extent of surface contact as to prevent them from riding into or catching in the slot but their purpose is the same in general as previously described relative to the contact points 2 and 3.

There is a fundamentally new manner of gauge operation in this arrangement of the two adjustably fixed contact members and the third contact member formed or provided at the end of the indicator actuating bar 8. This will be understood more clearly from Figs. 2, 4 and 15. With sufficient pressure exerted on the tool to move it toward the work as previously described the work is ground away and thus lessened in diameter permitting movement of the tool and consequently movement of the bar 8 is in extent several times the thickness of stock removed and thus a multiplication of the extent to which the work is reduced in diameter is secured without utilization of instrumentalities such as levers and the like to secure such multiplication. This will be understood from the following.

Figure 15:
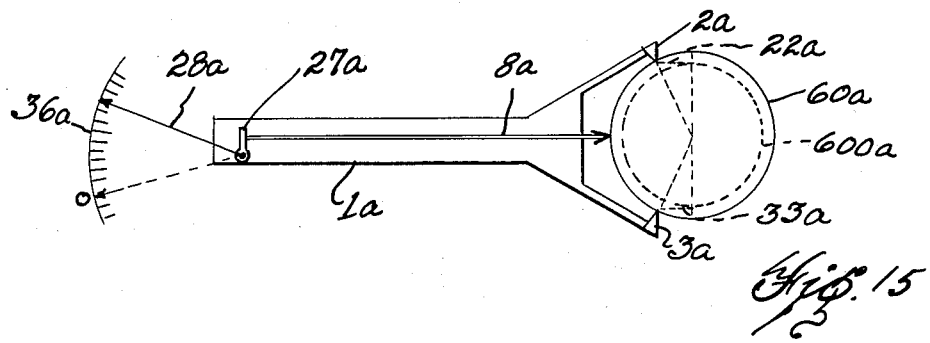
Fig. 15 is a diagram illustrating the relationship of the gauge parts and manner of securing the indicator operation.

In Fig. 15 for instance it will be observed that the work being reduced in diameter will permit the shoes 2 and 3 to move toward a diametrical line and as the work is finished as indicated in Fig. 4 the shoes have moved onto the work to such a point that the center line of contact of each shoe 2 and 3 is on a radial line of the work at an angle to the diametrical line of approximately twelve to fifteen degrees. The indicator parts are so arranged that when the shoes reach this final position of Fig. 4 the indicator is moved to the zero point. The purpose of so arranging the parts, in which the center point of contact of the shoes do not reach a position on diametrical opposite sides of the work, is that in such position the shoes are apt to catch or stick on the work which condition of operation is obviated by the arrangement of the parts described. In Fig. 4 the diametrical line toward which the shoes are moved is indicated by a dotted line $a$ while the radial lines referred to are indicated by the dotted lines $b$ and $b^1$ and the line of movement of the bar 8 is at a right angle to the diametrical line $a$. The two shoes being fixed as to their distance apart can only move onto the work to an extent permitted by the stock removed in the grinding or diameter reducing operation.

As the grinding continues the possible movement of the tool and therefore the shoes toward the diametrical line of the work is greater in extent than the thickness of the stock removed as these shoes are riding the surface of the work and movable relatively at an angle to the diametrical line $a$ referred to while the end of the bar 8 may move with the tool only to the extent of removal of stock and relative to the tool by reason of the greater distance the shoes 2 and 3 may move by reason of such removal of stock. This is graphically shown in Fig. 15 from which it will be observed that the shoes $2a$ and $3a$ move on the dotted lines $22a$ and $33a$ about several times the thickness of stock removed as indicated by the dotted circle $600^a$. It will therefore be seen that the permitted travel of the bar 8 with the tool is limited by the thickness of stock removed or diametrically of the work while the travel of the shoes $2a$ and $3a$ is much greater due to their movement being practically on a tangent to the finished circle. This difference in space traversed by the respective contacts results in movement of the indicator $28a$ relative to the dial $36a$ and, as the shoes $2a$ and $3a$ reach final positon as in Fig. 4 the indicator reaches the dotted position in Fig. 15 indicating the zero line and completion of the work. Therefore, as the movement of the tool as a whole is greater than the thickness of the stock removed the resultant effect is to cause a relative movement of the rod 8 which is a multiple of the thickness of stock removed.

It is thus to be seen that a fundamentally new relationship of parts and resultant gauging effect is secured in that, while the actual thickness of the metal removed is to be indicated through movement of the rod 8, the shoes 2 and 3 and the body of the tool move to a materially greater extent as the diameter of the stock is reduced and advantage is taken of this peculiar relationship of parts to eliminate elements heretofore necessary of utilization to produce movement of the indicator in multiple of thickness of stock removed and accuracy is secured as a result of the shoes being fixed in distance apart. Thus the indicator member 36 has graduations of considerable distance apart for each thousandth or fraction of an inch of reduction in diameter of the stock. I have therefore simplified the mechanism and provided for multiple movement of the indicator lever by the single rod directly contacting the short arm of the lever, the long end of which carries the pointer traversing the graduations.

As previously stated this gauge is semi-automatic in its operation and, as it is designed to be used by persons more or less unskilled in operation of precision instruments, it is desirable to so mount the device that it cannot be jammed onto the work and thus injure or break the parts. For this reason, and to save the time of the operator, the gauge is pivotally supported on the arm 15. This arm is also pivotally supported by a casing 70 attached to a fixed part of the grinding machine here shown as the splash guard 71 of the grinding wheel 72. The casing 70 has a removable cap 73 for the chamber 74 in its upper end.

The opposite sides of the casing are provided with a boss one of which is shown at 75 in Fig. 1 providing bearings for the shaft 76. The arm 15 is attached to the end of the shaft projecting on the opposite side from that shown in Figs. 1 and 9 as will be more clearly understood from Fig. 14. A stop device 77 is secured to the boss extending on the arm side of the casing 70. This stop is formed of a split ring having a screw 78 for clamping the same on the boss and is also provided with an extending arm 79 positioned in the path of movement of a rib 80 on the arm 15 and thus limits the downward movement of the arm in moving the same from the position shown in dotted lines in Fig. 1 to the position shown in full lines therein. This downward movement of the arm brings the tool to position to engage the work 60 but in order that the workmen may not jam the tool onto the work I have provided a control means for movement of the arm shown more clearly in Fig. 9.

This control consists of a disk 81 fastened to the shaft 76 on that portion thereof within the chamber 74. Pivotally attached at their upper ends to the disk 81 on opposite sides of the shaft 76 are links 82 and 83. These links at their opposite ends are connected respectively to the plungers 84 and 85 riding in cylinders 86 and 87 formed in the body of the member 70 below the chamber. These cylinders at their bottom ends have communication with a cross channel 88. The cylinder 86 is provided with an aperture 89 tapered at its upper end to which the cylinder opens to receive a ball 90 which acts as a check valve. The cylinder 87 is provided with a similar aperture and ball check.

Each of the cylinders is also provided with an aperture 91 and 92 respectively and these latter apertures are respectively provided with adjustable tapered pins 93 by means of which the opening and consequently movement of the fluid through the respective apertures 91 and 92 may be varied or controlled. Fluid, such as oil for instance, fills these cylinders, apertures, and cross channel 88 and it will be noted that movement of the arm 15 from the full line position of Fig. 1 to the dotted line position will cause the piston or plunger 84 to move upward in its cylinder 86 and the opposite plunger 85 to move downward in its cylinder 85. This movement downward of the plunger 85 in its cylinder tends to force fluid outward through the restricted aperture 92 through the cross channel 88, and upward through the aperture 89 filling the cylinder 86 behind the plunger 84. This arm therefore cannot be raised more rapidly than is permitted by the restricted flow of fluid from the cylinder 87 and movement of the arm in a reverse direction—that is, from the dotted line position in Fig. 1 to the full line position or approximately thereto, is likewise restricted. Therefore, this movement by the operator cannot be rapid at any time or of such force as would cause the tool to be jammed to place. In fact, as hereafter described, it is only necessary for the operator to raise the arm or lower the same for a slight distance as mechanism is provided to thereafter automatically move the arm, subsequent to the start of its movement in either direction by the operator, to its final upper or lower position. This is accomplished by the provision of a cylindrical recess at one side of the cylinders or recesses 84 and 87 in which is located a coiled compression spring 94.

In the upper end of the spring recess is a plunger 95 to which one end of a link 96 is pivotally connected, the opposite end of the link being pivotally connected to the disk 81 at a point 97 on a line passing through the axis of the shaft 76 at a right angle to the line connecting the pivotal points of the links 82 and 83 to the disk. The axis of the shaft is vertically above the spring member and pivot point of the link 96 to the block or plunger 95. It is thus to be seen that by raising the arm 15 from the position indicated in Fig. 9 the plunger 95 is forced downwardly in its recess compressing the spring and, as the point 97 passes the vertical line between the axis of the shaft and pivot point of the link 96 in the block 95, the spring will then turn the disk and continue the movement of the arm in that direction to its final uppermost position indicated by the dotted lines of Fig. 1. Likewise, in the reverse the direction of movement from the dotted line position, the operator simply moves the arm until the link has passed this vertical line between the shaft and the block 95 whereupon the arm may be released and the spring will continue to move the arm downward until the shoes 2 and 3 engage the work. This maintains pressure of the tool against the work causing the same to feed onto the work during the rough grinding or until the arm 15 comes to engagement with the stop 79. Thereupon the spring 18 attached to the arm 17 causes further movement of the tool as the final or finishing cuts are made on the shaft or article being ground.

It is to be noted that the arm 15, on being moved to position shown in full lines in Fig. 1, is brought against the stop 79 by action of the spring 94 and that the arm is brought to the said stop irrespective of the fact that the gauging shoes engage the work just previous to the arm engaging the stop. Thus the gauge is stopped in its movement onto the work by the shoes 2 and 3 and, as the arm 15 may continue its movement thereafter to engagement with the stop 79, such movement causes a tension to be placed on the spring 18 as the pin 20 is turned away from the stop 19. Thus in the gauging operation the spring 18 tends to move the gauge onto the work as rapidly as the surface is removed. Upon raising the arm from the full line position shown in Fig. 1 the pin 20 comes to engagement with the stop 19 limiting the movement of the tool body relative to its arm. Thus the tool has the gauge parts always in the correct position to engage the work without the necessity of particular attention by the operator in directing its movement or the positioning of the same on the work.

The gauge is shown as being supported on the splash guard of the grinding wheel and as this guard may vary in position relative to the axis of the work being ground, due to necessity of adjusting the position of the grinding wheel to compensate for wear, it is desirable to have the arm attached to the guard adjustable. Adjustment, however, is not often necessary as the lost motion secured by the link 19 provides a tool that is self adjustable for some wear within the limits of the lost motion. Where greater wear is to be compensated for the tool supporting arm may be made adjustable, although not here so shown.

From the foregoing description it is evident that the various objects of the invention are attained by the preferred form of construction described—that is, a simple and comparatively inexpensive instrument for visibly indicating the extent of removal of stock in the reduction of diameter of a piece of work and a tool that is semi-automatic in its operation enabling the device to be utilized in the production of accurate work by persons practically unskilled in the art.

It is further to be understood that the described arrangement and construction of the elements is the preferred form and that various changes may be made therein without departing from the spirit and scope of the invention as set forth in the appended claims.

Having thus fully described my invention, what I claim and desire to secure by Letters Patent of the United States is—

1. A gauging device for automatically indicating when a piece of work has been reduced to a predetermined diameter comprising an elongated body member, a pair of arms extending outwardly from one end thereof on opposite sides, a work contacting element carried by each arm at its outer end, means for adjusting the said elements to a distance apart relatively less than the diameter to which the work is to be reduced, an element movable longitudinally of the body on a line approximately equi-distant between the said work contacting elements and practically at a right angle to a line passing between their center points of contact with the work, said movable element having contact with the work on the said line of its movement, a pointer member pivotally mounted in the said body and having a short arm and a long arm providing a pointer element, the said longitudinally movable element engaging the said short arm whereby movement of the said element relative to the body in a direction away from the work causes movement of the said pointer member, a spring for maintaining the said short arm in engagement with the said element, a dial relative to which the pointer element is movable and having a zero indication toward which the pointer is moved by the said movement of the movable element, and means for pressing the work contacting elements against the work whereby movement of the body member relative to the work is permitted by reduction in diameter thereof, the parts being so arranged that the pointer comes to registration with the zero indication at the time the spaced work contacting elements occupy a predetermined position relative to a diametrical line of the work.

2. A gauging device for automatically indicating when a piece of work has been reduced to a predetermined diameter comprising an elongated body formed of oppositely disposed side plates, spacer elements between the plates at opposite edges providing a longitudinal way centrally between the plates, a bar slidably mounted in the said way and having a work engaging end at one end of the body, a pair of oppositely disposed work contacting elements in adjustably fixed spaced relation less than the diameter to which the work is to be reduced, an arcuate dial member exposed to view at the opposite end of the body, a pointer pivotally supported adjacent the said opposite end of the body and having an end portion movable over the said arcuate dial, said pointer member having a short arm portion, said bar at its other end engaging the said short arm, yieldable means for holding the short arm in engagement with the bar, means limiting movement of the said bar relative to said body, means forcing the oppositely disposed contact elements against the work, movement of the oppositely disposed contact elements while in engagement with the work being on lines tangent to the circumference of a circle of the finished diameter and therefore in excess of movement of the third element, toward the axis of the work, and stop means limiting movement of the body toward the axis of the work, said dial having an indication with which the pointer registers at the time the oppositely disposed work contacting elements reach a predetermined position relative to a diametrical line of the work parallel with the line extending from center to center of said work contacting elements.

3. A gauging device adapted to be held in contact with work during the reduction in diameter thereof comprising a body, two oppositely disposed work contacting elements at one end of the body normally fixed as to distance apart, means for holding the body with the points of said contacting elements in engagement with the work and to cause the body to move toward the work as the diameter thereof is reduced, said means consisting of an arm pivotally mounted to and adjacent the other end of the body, and a spring between the said body and the said arm tending to cause movement of the body toward the work, a third work contacting element carried by the body and positioned between the said first elements and movable with the body toward the work on a diametrical line thereof, the arrangement of the said parts being such that the two first named work contacting elements and the third element move toward the axis of the work as the stock is removed and produce a movement of the third element relative to the body to an extent in excess of the thickness of the stock removed, and an indicating means actuated by the movement of the two work contacting elements relative to the third element.

4. A gauging device for determining when a piece of rotating work is ground to the desired diameter by a grinding wheel comprising a gauge element positioned to contact the work on the side opposite to that engaged by the wheel, said gauge element including a pair of oppositely disposed work contacting elements normally spaced a fixed distance apart and a body by which the work contacting elements are supported, means for moving the gauge toward the axis of the work as rapidly as permitted by the removal of the stock therefrom, said means including a pivotally supported arm to which the body is connected at its opposite end, and a spring between the body and arm for causing movement of the body toward the work, a third work contacting element, and an indicating mechanism actuated by said third element by reason of movement of the gauge toward the said axis, said indicating mechanism including a means for visibly determining when the work contacting elements have been moved to predetermined position relative to a diametrical line of the work.

5. In apparatus of the character described, a device adapted to automatically indicate when a piece of work has been reduced to a predetermined diameter, said device including contact elements normally spaced a fixed distance apart and relatively less than the diameter to which the work is to be reduced and first engaging opposite sides of the work at points on a line parallel with and at one side of a diametrical line thereof, a supporting element for holding the device in an operative or a non-operative position, means acting when the device is in operative position to move the said work contacting elements toward said diametrical line as the diameter thereof is reduced, said means comprising an arm pivotally connected with the supporting element at one end and with said device at the other and a spring between said arm and said device for forcing the contact elements to engagement with the work, a third work contacting element, and an indicator actuated by said third element and giving a visible indication when the said fixed work contacting elements occupy a predetermined position relative to a diametrical line of the work.

6. In apparatus of the character described, a device adapted to indicate when a piece of work has been reduced to a predetermined diameter, said device including contact elements adjustably fixed as to distance apart and first engaging opposite sides of the work at points on a line parallel with and at one side of a diametrical line thereof, a supporting element for holding the device in operative or non-operative position, means adapted to yieldably urge the supporting element to position the device in said operative or non-operative position, and means acting when the device is in operative position to move the work contacting elements toward said diametrical line as the diameter of the work is reduced, and an indicator giving a visible indication when the work contacting elements occupy a predetermined position relative to a diametrical line of the work.

7. In apparatus of the character described, a device adapted to indicate when a piece of work has been reduced to a predetermined diameter, a pivoted supporting element movable to position the device in operative or non-operative relation with the work, means for turning the supporting element on its pivot including a spring, a plunger movable by the spring, a shaft providing a pivotal support for the element, means including a link connecting the plunger with the shaft and tending to turn the shaft and element when the point of connection of the link relative to the shaft is moved to one side or the other of a straight line between the pivot point of the link with the plunger and the axis of the shaft, and means restricting the rapidity of movement of the element by the spring.

8. In apparatus of the character described, a device adapted to indicate when a piece of work has been reduced to a predetermined diameter, a pivoted supporting element therefor movable to position the device in operative or non-operative relation with the work, means for turning the supporting element on its pivot including a casing having a recess, a spring in the recess, a plunger in the recess movable by the spring when under compression, a rotatable shaft extending through the casing to which the supporting element is secured, a disk like element within the casing secured to the shaft, a link pivotally connected at one end to said plunger and at the other end to the disk whereby rotation of the disk and shaft causes compression of the spring as the pivot point of the link and disk passes a line connecting the axis of the shaft with the pivot point of the link and plunger and the pressure of the spring thereafter causes rotation of the disk and shaft, there being a pair of cylinders in the casing on opposite sides of the line connecting the axis of the shaft and pivot point of the plunger, a piston for each of said cylinders, a link for each piston connected respectively therewith at one end and with the disk on opposite sides of the axis of the shaft at the other end whereby, on rotation of the disk and shaft in one direction or the other, one of the pistons is moved outwardly of its cylinder and the other is moved inwardly thereof, the casing having a cross passageway and a passageway connecting with the bottom of each cylinder and with the cross passageway, a check valve in each of the said cylinder passageways permitting movement of fluid from the passageway to the cylinder in one direction only, there being a second passageway for each cylinder opening to the cross passageway, a valve member for each of said second passageways providing for a predeterminable restriction of flow therethrough, the structure providing a means whereby, upon turning the supporting element and its shaft in one direction or the other, the plunger link passes to one side or the other of the said line connecting the axis of the shaft and pivot point of the link and plunger permitting the spring to expand and turn the shaft and supporting element in the same direction.

9. A gauging device for use on work during its reduction in diameter comprising a body, a pair of work contacting elements carried thereby each having an arcuate face approximately of a radius equal to the radius to which the work is to be reduced, said work contacting elements being normally fixed as to distance apart, a line extending between the center points thereof on first engaging the work being parallel with a diametrical line of the work at one side thereof, means for positioning the body with the contact elements in engagement with the work including a supporting means for the body, spring means between the supporting means and the said body for causing the contacting elements to move onto the work while being reduced in diameter, an indicator, and an actuator therefor caused to operate the indicator by said movement of the said pair of contact elements onto the work.

10. A gauging device for use on work during its reduction in diameter comprising a body, a pair of work contacting elements carried thereby and normally spaced a fixed distance apart slightly less than the diameter to which the work is to be reduced, said elements having arcuate faces, the radii of which are approximately equal to the radius of the finished work, a supporting device for the body, means for causing the support to move the body to place the work contacting elements in engagement with the work, means for moving said contacting elements with the work as it is reduced in diameter, an indicator including a movable element carried by the body, and an actuator therefor also carried by the body and engaging the face of the work and positioned to be moved toward the work to an extent equal to the thickness of stock removed, said movable element being connected with said indicator and moved thereby due to the relative difference in extent of movement of the work contacting elements and movement of the actuator through reduction in diameter of the work.

11. A gauging device for use on work during its reduction in diameter consisting of an elongated body, a pair of work contacting elements supported at one end thereof normally a fixed distance apart, a supporting arm to which the body is pivoted adjacent its opposite end, said work contacting elements first engaging opposite sides of the work, the line between the center points of contact thereof being parallel to a diametrical line and at one side thereof, a pivoted support for said supporting arm, permitting the arm to be raised to remove said body and contacting elements from the work or lowered to bring the same to engagement with the work, a stop limiting the extent of movement of the said arm in placing the gauge on the work, a spring tending to move the contact elements onto the work as it is reduced in diameter, and a third work contacting element for engaging the work on a diametrical line thereof approximately at a right angle to a line passing equi-distantly between the points of contact of the said pair of contact elements with the work, an indicator at the pivoted end of the body, and a connection between said third element and the indicator whereby the indicator is actuated due to the relative difference in extent of movement of the work contacting elements and movement of the actuator due to reduction in diameter of the work.

12. A gauging device for use on cylindrical work during its reduction in diameter comprising an elongated body, a pair of work contacting elements supported at one end thereof and normally fixed in distance apart less than the diameter to which the work is to be reduced, means for causing the said elements to engage the work and to move thereonto as rapidly as permitted by removal of stock, said means including an arm having a pivotal mounting and being pivotally connected with the said body and means tending to turn said arm on its pivot to position the work contacting elements in engagement with the work, a dial having the form of a graduated line at the opposite end of the body, a pointer movable thereover, an actuator therefor comprising a rod extending longitudinally of the body and operatively connected at one end with the pointer and adapted at the other end to engage the work at a point midway between the two said work contacting elements, the said actuator rod being likewise moved toward the said diametrical line with less rapidity due to a different point of contact with the work whereby the indicator is moved to an extent determined by the difference in the distance traversed by the two said work contacting elements and the said actuator through reduction in diameter of the work.

13. A gauging device for use on work during reduction in diameter thereof comprising a body, a pair of elements mounted in adjustably fixed relation therewith and normally fixed in distance apart less than the diameter of the work to be operated on and contacting the same on one side, the line between the center points of contact of said elements with the work being parallel to a diametrical line thereof, a third work contacting element supported by the body and being movable relative to said pair of work contacting elements and engaging the surface of the work on a diametrical line extending equi-distantly between said pair of contacts, means for moving the said body toward the work while it is being reduced in diameter, said means comprising a pivoted arm supporting the said body, and a spring means tending to turn the arm on its pivot to thereby position the work contacting elements in engagement with the work, an indicating means operatively connected with said third contact element and actuated by reason of movement of the pair of contacts in excess of movement of the third contact through reduction in diameter of the work.

PHILIP S. ARNOLD.